United States Patent [19]

Stone

[11] Patent Number: 4,661,696
[45] Date of Patent: Apr. 28, 1987

[54] OPTICAL ENCODER WHICH USE A RECTANGULAR PHOTODETECTOR ARRAY

[75] Inventor: Thomas R. Stone, Pleasanton, Calif.

[73] Assignee: Plus Development Corporation, Milpitas, Calif.

[21] Appl. No.: 741,174

[22] Filed: Jun. 4, 1985

[51] Int. Cl.⁴ ............................................. H03M 1/00
[52] U.S. Cl. ......................... 250/231 SE; 250/237 G; 340/347 P
[58] Field of Search ...................... 250/231 SE, 237 G; 324/175; 340/347 P; 356/395

[56] References Cited

U.S. PATENT DOCUMENTS 4,184,071  1/1985  Fryer et al. .................... 250/231 SE
4,593,194  6/1986  Graham et al. ............... 250/231 SE Primary Examiner—David C. Nelms
Assistant Examiner—S. Allen
Attorney, Agent, or Firm—David B. Harrison

[57] ABSTRACT

An improved optical encoder is disclosed. The encoder includes a moveable scale with alternating equally dimensioned opaque and translucent regions extending generally perpendicular to the locus of scale movement; and a light source, a mask and a rectangular photodetector array having at least a pair of generally symmetrical, rectangular photodetector areas, the longitudinal dimensions of those areas being disposed relative to the regions of the scale at a predetermined acute angle of rotation. The mask defines at least two series of equally spaced apart elongated phase shifted openings aligned to be generally parallel with the regions of the scale, the mask openings being aligned at the same angle of rotation as the major lineal dimensions of the photodetector areas. The mask openings are substantially coextensive with the rectangular photodetector areas. The light source, mask and photodetector array are commonly mounted on a single axis of rotation in a rotatable stationary housing. Rotation of the housing provides a smooth bilateral electrical phase trim; and, the improved encoder uses a rectangular photodetector array of the minimum effective size.

4 Claims, 2 Drawing Figures

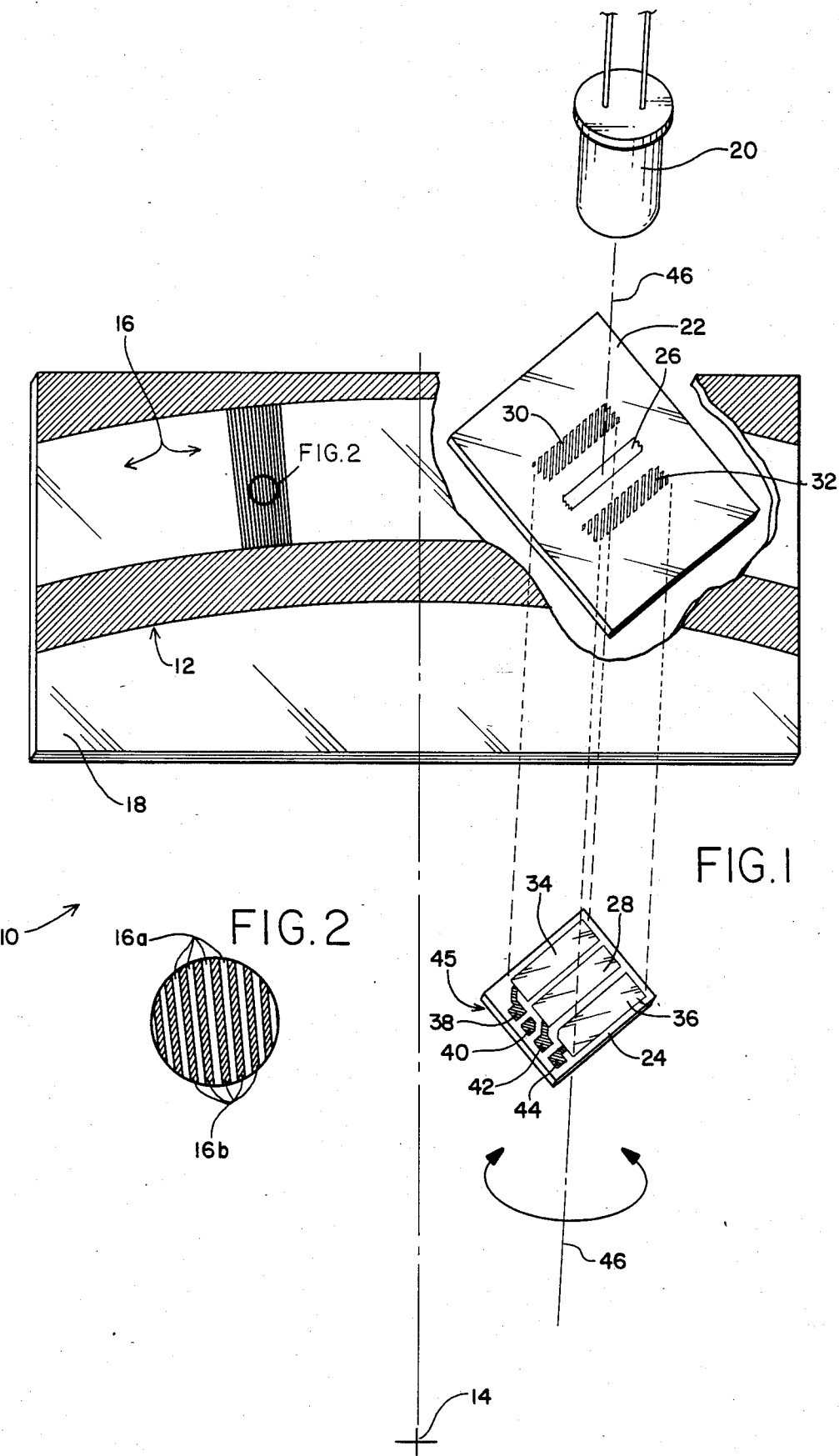

OPTICAL ENCODER WHICH USE A RECTANGULAR PHOTODETECTOR ARRAY

BACKGROUND OF THE INVENTION

The present invention relates to relative incremental position encoders. More particularly, the present invention relates to an improved two-cell, two-phase optical encoder which effectively uses a minimum photodetector cell array size and rectangular geometry and which provides a diagonal cell geometry to achieve a smooth adjustment for trimming relative phase difference.

REFERENCE TO RELATED PATENTS AND PATENT APPLICATIONS

The following U.S. patents and applications are pertinent:

U.S. Pat. No. 4,396,959 for Data Transducer Position Control System for Rotating Disk Data Storage Equipment, the disclosure of which is incorporated herein by reference.

U.S. patent application Ser. No. 06/555,591 filed on Nov. 28, 1983 for Optical Encoder Apparatus and Methods, the disclosure of which is incorporated herein by reference.

U.S. patent application Ser. No. 06/609,224 filed on May 11, 1984, for Optical Encoder, the disclosure of which is incorporated herein by reference.

U.S. Pat. No. 4,396,959 describes a disk drive which uses an optical encoder for two purposes: coarse servoing during track following and track boundary detection during track seeking. FIGS. 5-7 describe the operation of the encoder as based on a four-cell photodetector array wherein each cell is masked to be phase offset from the other three cells. The cells are paired diagonally and are differentially amplified to yield two phase signals which are ideally in perfect quadrature. Phase adjustment for trimming the encoder is provided by rotating the detector array about a central axis. This rotational adjustment is achieved with the encoder shown in FIG. 5 of the referenced patent, and it enables the two phases put out by the encoder to be precisely quadrature related. In this manner, the four tracks defined by a full cycle of the encoder array are all of equal widths. A further explanation of the photodetector array may be found in U.S. Pat. No 4,224,514 to Weber, which patent provides useful background information.

Subsequent to the development of the disk drive described in the referenced U.S. Pat. No. 4,396,959, a need arose for a two-cell optical encoder which provided for phase quadrature output and which also enabled a smooth adjustment of phase so that the desired precise phase relationship between the two cells would be achieved. One solution was proposed in the referenced U.S. patent application Ser. No. 06/609,224. In that application a generally circular two-cell array was proposed with a diagonal non-light-sensitive region dividing the two cells so as to provide each of the two cells with a generally semicircular light sensitive area, thereby achieving the diagonal relationship found to be useful for precise bilateral phase trim adjustment as followed in the referenced earlier U.S. Pat. No. 4,396,959, without excessive sensitivity during the trimming process (i.e. amount of phase shift per degree of rotation of the encoder assembly).

There are several drawbacks with photodetector arrays of the form shown in the referenced application Ser. No. 06/609,224. One drawback to the circular outline approach is that the known manufacturing processes for integrated circuit photodetector arrays favor formation of dies of generally rectangular shape. This favoritism is attributable to the need to separate the arrays from a silicon wafer on which they are formed along longitudinal and transverse scribe lines applied to the wafer incident to a dicing operation.

For reasons of efficiency and cost, it is also desirable to devote as much of the area of the photodetector die as possible to light-sensitive areas. This tends to favor rectangular light-sensing areas separated from one another and from the edges of the die by non light-sensitive borders of minimum size.

Another factor is that the yield in manufacturing of acceptable photodetector arrays varies inversely with the area thereof. Unwanted defects and impurities are statistically more prevalent in larger area cells. Since the photodetector array is the single most expensive component of an optical position encoder, and since its cost varies directly with its area, an encoder employing an array having the smallest effective photosensitive area is apt to be the most economical and therefore, most practical, at least from an economic point of view.

Finally, it is desirable to form such arrays in a manner which enables a symmetrical connection arrangement along a single edge of the photodetector chip with a minimum of semiconductor topology (area). (The provision of all connection pads along a single edge of the photodetector die greatly facilitates connection of the die to the traces of an adjacent circuit board, such as is described in the referenced application Ser. No. 06/555,591, particularly as discussed in connection with FIG. 8 thereof). Also, it is desirable to arrange the light-sensitive areas of the array in as symmetrical a manner as possible. It is generally believed by those skilled in the photodetector array art that the uniformity of electrical characteristics between cells of an array is directly related to the degree of symmetry existing between the cells. Thus, symmetrical layout of photodetector arrays is preferred.

In summary, it has now been discovered that the ideal photodetector die would be rectangular in shape, have rectangular light-sensitive regions of maximum area, arranged as symmetrically as possible upon the surface of the die, would have electrical connecting paths of minimum length and area, and would have its electrical connection pads arranged along a single edge of the die.

A need has therefore arisen for a two-phase optical incremental position encoder which employs two photo sensitive areas formed on a common substrate in an arrangement exhibiting the desirable features just enumerated and which still provides phase adjustment so that the difference between the two phases may be precisely adjusted and trimmed within a narrow range.

SUMMARY OF THE INVENTION WITH OBJECTS

One general object of the present invention is to overcome the limitations and drawbacks of prior art polyphase optical incremental position encoders employing diagonal photocell arrangements for smooth phase trim.

Another more specific object of the present invention is to provide a two phase optical encoder which achieves smooth phase trim while utilizing a photodetector chip defining substantially symmetrical rectangular photosensitive areas which is of the smallest effective size in consideration of the available light energy level from the encoder's light source.

One more object of the present invention is to dispose a rectangular photodetector chip of a polyphase optical encoder at a predetermined angle relative to a moving scale and to adapt openings of a mask overlying the photodetector chip so that a generally diagonal cell arrangement facilitating phase trim is thereby achieved.

Still another object of the present invention is to size an optical scale having equally spaced apart and equally dimensioned light opaque and translucent lines so that a small photodetector chip having rectangluar photosensitive areas may be oriented at a predetermined angle relative to the scale and still fit entirely inside the useful area of the scale.

Still one more object of the present invention is to provide a light mask for a photodetector array of an optical encoder wherein the light mask defines a series of equally spaced apart translucent lines having widths approximately equal to the spaces between them and which is disposed to be congruent with translucent lines of a moving scale, wherein the arrangement of the lines of the mask is such as to pass light energy to a rectangular photosensitive area of the array disposed directly beneath the mask and aligned at an angle such as forthy five degrees relative to the lines of the moving scale.

An improved optical encoder achieving these objects of the present invention includes a moveable scale with alternating equally dimensioned opaque and translucent regions extending generally perpendicular to the locus of scale movement. The encoder further includes a light source, a mask and a generally rectangular photodetector array having at least a pair of photodetector areas responsive to light energy from said light source to produce electrical analog signals. The light source, mask and array are preferably commonly mounted on a single axis of rotation in a rotatable stationary housing affixed to a base relative to the moveable scale. The mask defines at least two sets of openings with one set being spatially offset from the other set so that predetermined phase difference is thereby provided.

The improvement includes the formation of generally rectangular photodetector areas, with the major lineal dimensions of the areas being disposed relative to the regions of the moveable scale at a predetermined acute angle of rotation.

Each set of the mask defines a series of equally spaced apart elongated microlines or openings aligned to be generally parallel with the translucent regions of the moveable scale. The mask openings are aligned at the same predetermined angle of rotation relative to the major lineal dimensions of the photosensitive areas of the photodetector array. The openings are sized and arranged to be substantially coextensive with the photosensitive area.

The housing is rotatable about a central axis of rotation so that the phase difference between the electrical outputs from the two cells may be readily trimmed to a predetermined precise phase difference, which is quadrature (90°) in the preferred embodiment.

In one aspect the predetermined angle of rotation of the array relative to the translucent lines of the scale is nominally forty five degrees and said predetermined phase difference between the cells is nominally ninty degrees, so that the angle of rotation may be trimmed to bring the phase difference precisely to phase quadrature.

In another aspect the length of each of the translucent regions of said scale is at least as great as the overall height of the rectangular photosensitive areas of the photodetector array at its predetermined angle of offset relative to the scale lines.

These objects, advantages and features will be further appreciated from a consideration of the following detailed description of a preferred embodiment, presented in conjunction with the accompanying drawing.

BRIEF DESCRIPTION OF THE DRAWINGS

In the drawings:

FIG. 1 is an exploded and partially broken away schematic view of an optical encoder following the principles of the present invention.

FIG. 2 is an enlargement of a circular portion of the microline scale of the optical encoder depicted in FIG. 1.

DETAILED DESCRIPTION OF A PREFERRED EMBODIMENT

An optical encoder which employs the principles of the present invention is generally referred to by the reference numeral 10. The encoder includes a moving scale 12 which in the illustrated embodiments moves radially along an axis of rotation 14. The scale 12 includes a radial area 16 defining a multiplicity of spaced apart light translucent lines 16a which are separated by light opaque lines 16b FIG. 2. These alternating light passing and blocking lines are formed by selectively depositing a layer of an opaque material such as chromium onto a glass substrate 18 which may be affixed to a moving structure (not shown) whose incremental position will be measurable by the displacement of the lines relative to the other elements of the encoder 10 which will now be described.

A light source 20, such as a high intensity infrared light emitting diode, (type OP296A manufactured by TRW is presently preferred), is disposed to shine through the scale and also through a reticle or mask 22. The mask 22 is generally rectangular in shape, and it fits directly over a small rectangular photodetector array 24 which will be explained further, shortly.

The mask 22 may be formed upon a glass substrate by depositing chromium in all areas other than the light translucent regions. In the embodiment shown, the mask 22 provides three light translucent regions. A central region 26 enables a reference level of light energy to pass to an underlying photodetector cell 28 which may be employed to control automatic gain circuitry regulating output level of the light source 20.

Two rectangular regions 30, 32 of the mask 22 define sets of parallel openings. The openings of the upper region 30 are positionally offset from the openings of the lower region 32 by a dimension which, in combination with the spacing and dimensions of the scale lines, provides for a predetermined nominal phase difference, which is established at ninety degrees in the preferred embodiment.

While being aligned to be congruent with the the translucent lines of the scale 20, the parallel openings of the regions 30, 32 are also arranged to overlie two small rectangular photosensitive areas 34 and 36 of the photodetector chip 24 as shown by the four dotted explosion lines in the Figure.

As seen in FIG. 1, the chip 24 provides for four connection pads 38, 40, 42, 44 along a single edge 45 thereof. The pads 38, 42, and 44 respectively connect to the cells 34, 28 and 36, and the pad 40 provides a return connection to the chip substrate. This arrangement of connection vastly simplifies and facilitates connection of the chip 24 to miniature traces of a small circuit board, in accordance with the teachings of the referenced U.S. patent application Ser. No. 06/555,591. At the same time, the connections between the pads and the cells are uniformly located and are kept to a very minimum area of the photodetector chip 24, thereby minimizing inequalities attributable to differences in connection locations and geometry.

The photodetector chip 24 may be formed with other detectors present, such as a reference location detector cell, also as taught by the referenced application Ser. No. 06/555,591. Suitable arrangements to accomodate intended operation of the reference location cell would be made in the scale 20 and mask 22.

In the presently preferred embodiment of the optical encoder 10, the chip 24 is approximately 4.7 millimeters long by 4.0 millimeters wide. Each photosensitive cell area 34, 36 is approximately 3.50 millimeters long by 1.07 millimeters wide. The smaller, centrally located AGC cell 28 is 3.5 millimeters long by 0.86 millimeters wide. The scale 20 is designed to have an outside radius of 66.2 millimeters to its axis of rotation 14 and an inside radius of 60.64 millimeters to the same axis 14, so that each radial opening is 5.56 millimeters long. Each translucent radial opening is 0.0658 degrees wide as is each intervening opaque region. Each lineal opening of the mask 24 is approximately 0.0526 degrees wide, which is four fifths the width of each translucent radial opening of the scale 20. There are 18 lineal openings in the upper region 30 and there are 18 identical, phase offset openings in the lower region 32. The lineal openings in the lower regions 32 are made slightly longer in length than the openings in the upper region 30 in order to compensate for the difference in area resulting from the radial devergence of the slightly wedge-shaped scale openings.

It is to be understood that the light source 20, mask 22 and photodetector array 24 are commonly mounted in a housing affixed to a base in a manner which enables the housing to be rotated about a central axis of rotation 46, thereby providing a range of phase adjustment for trimming the phase difference of the encoder 10 to precisely the angle desired.

The theory underlying the effectiveness of the diagonal arrangement of photodetectors relative to the normal lines of the scale and mask is set forth in the referenced U.S. patent application Ser. No. 06/609,224 which should be consulted for further particulars.

Should some arrangement other than diagonal be desired for some particular application, such as one requiring a horizontal or vertical arrangement, one can achieve whatever pattern may be desired merely by rotating the photodetector chip 24 relative to the microline openings of the scale 20 to the desired relationship, and by then adjusting the arrangement of the regions 30 and 32 of the mask 22 to overly the photosensitive areas of the array 24 while remaining congruent with the scale microline openings.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosures and description herein are purely illustrative and are not intended to be in any sense limiting.

I claim:

1. In an improved optical encoder having a moveable scale with alternating equally dimensioned opaque and translucent regions extending generally perpendicular to the locus of scale movement; and a light source, a mask and a photodetector array having at least a pair of photodetector areas responsive to light energy from said light source to produce electrical analog signals, said light source, said mask and said array being commonly mounted on a single axis of rotation in a rotatable housing, the mask defining at least two sets of openings with one set being spatially offset from the other set so that a predetermined phase difference is provided between the electrical analog signals put out by the photodetector areas, the improvement comprising:

a generally symmetrical, rectangular photodetector array formed with generally rectangular photodetector areas, the major lineal dimensions of said areas being disposed relative to said regions of said scale at a predetermined angle of rotation, each set of said mask defining a series of equally spaced apart elongated openings aligned to be generally parallel with the regions of said scale, said openings being aligned at said angle of rotation relative to said major lineal dimensions of said areas and said openings being sized and arranged to be substantially coextensive with said areas, said housing being rotatable about said axis of rotation so that said phase difference may be bilaterally trimmed to its precise nominal value.

2. The improved optical encoder set forth in claim 1 wherein said predetermined phase difference is nominally ninety degrees and wherein said housing is adjustable about its axis of rotation to trim said phase difference precisely to phase quadrature.

3. The improved optical encoder set forth in claim 1 wherein the length of each of said regions of said scale is at least as great as the overall height of the areas of the photodetector array at said predetermined angle relative to said regions.

4. The improved optical encoder set forth in claim 1 wherein connection pads for electrically connecting to said photodetector areas and to the substrate of said array are formed along a single major edge of said array.

* * * * *